United States Patent
Slosberg

[15] 3,661,691
[45] May 9, 1972

[54] FLAME-RETARDANT VINYL FOAM CARPET AND METHOD

[72] Inventor: David K. Slosberg, Atlanta, Ga.

[73] Assignee: Pandel-Bradford, Inc., Lowell, Mass.

[22] Filed: Dec. 28, 1970

[21] Appl. No.: 101,552

[52] U.S. Cl. ..............................161/67, 156/72, 156/148, 156/242, 156/306, 161/159, 161/403
[51] Int. Cl. ...................D05c 17/00, B29c 27/00, C09j 5/00
[58] Field of Search ..............161/67, 159, 403; 156/72, 148, 156/242, 306

[56] References Cited

UNITED STATES PATENTS

| | | | |
|---|---|---|---|
| 3,402,094 | 9/1968 | Levitch | 161/63 |
| 3,518,102 | 6/1970 | Martgen et al. | 161/67 |
| 3,537,946 | 11/1970 | Truax et al. | 156/72 |
| 3,560,284 | 2/1971 | Wisotsky et al. | 156/72 |

*Primary Examiner*—William J. Van Balen
*Attorney*—Richard P. Crowley and Richard L. Stevens

[57] ABSTRACT

A flame-retardant vinyl resin-backed surface covering; e.g., tufted carpet, which carpet is characterized by enhanced flame resistance and reduced flammability-rate characteristics in that the vinyl backing is securely bonded to the tufted base and the thermoplastic primary backing is inhibited from shrinking and cracking under conditions of open-flame ignition. A vinyl foam-backed tufted carpet is prepared by applying a carboxylated cross-linkable vinyl chloride resin composition to the back surface of a thermoplastic backing sheet containing a pile face surface of tufted yarns; heating the plastisol composition to cross-link the vinyl chloride resin and to bond the tufted yarns to the thermoplastic base fabric while maintaining the temperature below the shrinkable temperature of the base fabric; and laminating the foam vinyl backing to the surface of the cross-linked vinyl chloride resin composition.

22 Claims, 8 Drawing Figures

Patented May 9, 1972

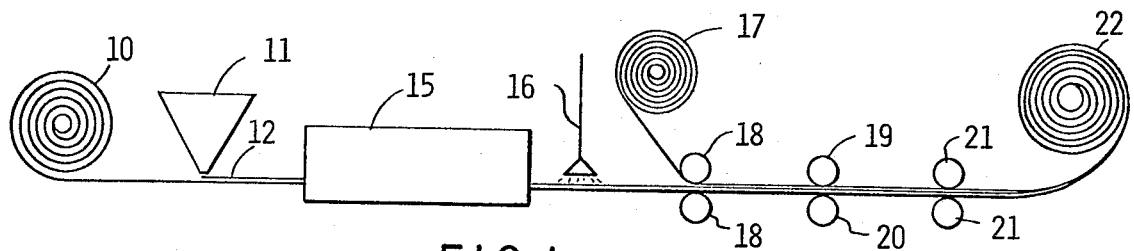

FIG. 1

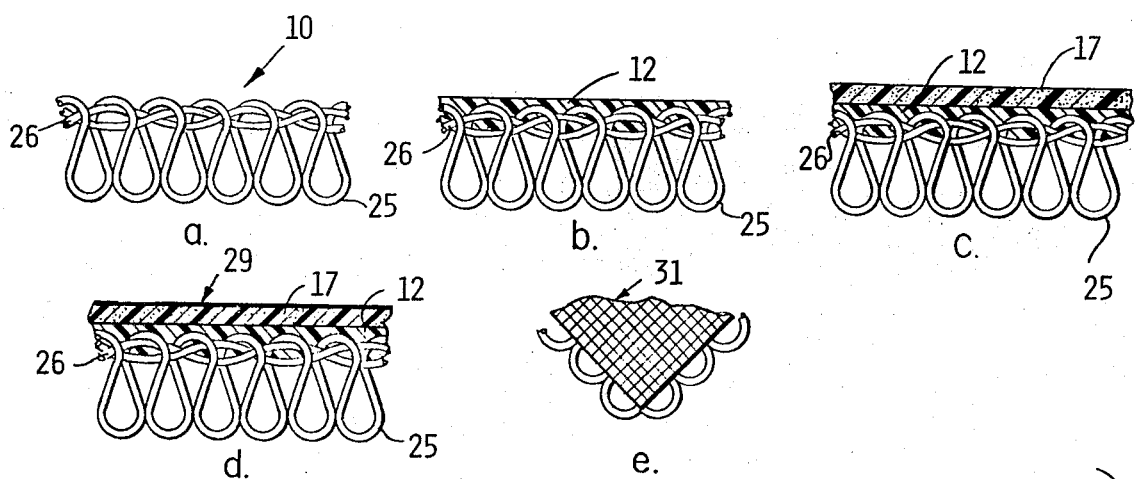

CAST LAYER OF A BLOWABLE CUREABLE NITRILE RUBBER-VINYL CHLORIDE RESIN ONTO SURFACE

↓

CONTACT WET RESIN WITH BACK SURFACE OF THERMOPLASTIC PRIMARY BACKING SHEET WITH TUFTED FIBERS

↓

HEAT RESIN COMPOSITION TO FORM CELLULAR, CURED NITRILE-RESIN COMPOSITION BUT TO TEMPERATURE INSUFFICIENT TO SHRINK PRIMARY BACKING SHEET

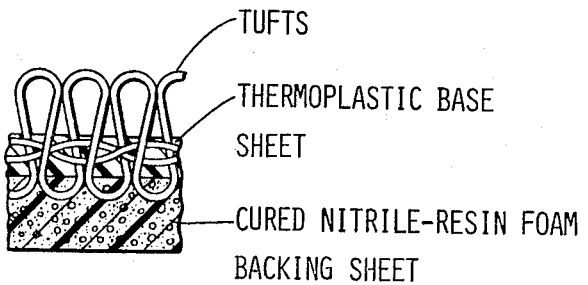

FIG. 5

INVENTOR
DAVID K. SLOSBERG
BY Crowley & Stevens
ATTORNEY

Patented May 9, 1972
3,661,691
2 Sheets-Sheet 2
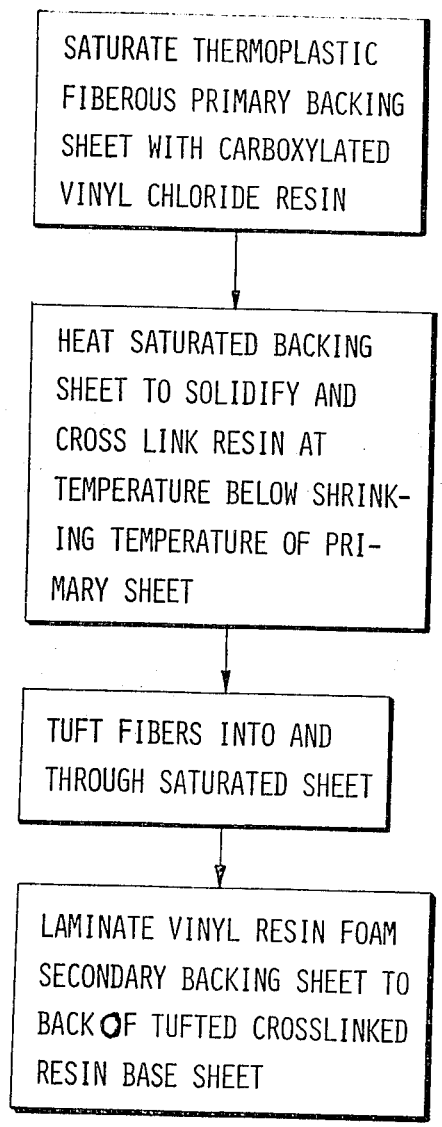
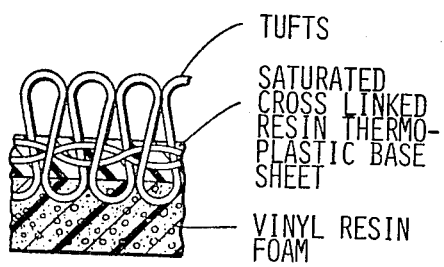
FIG. 3
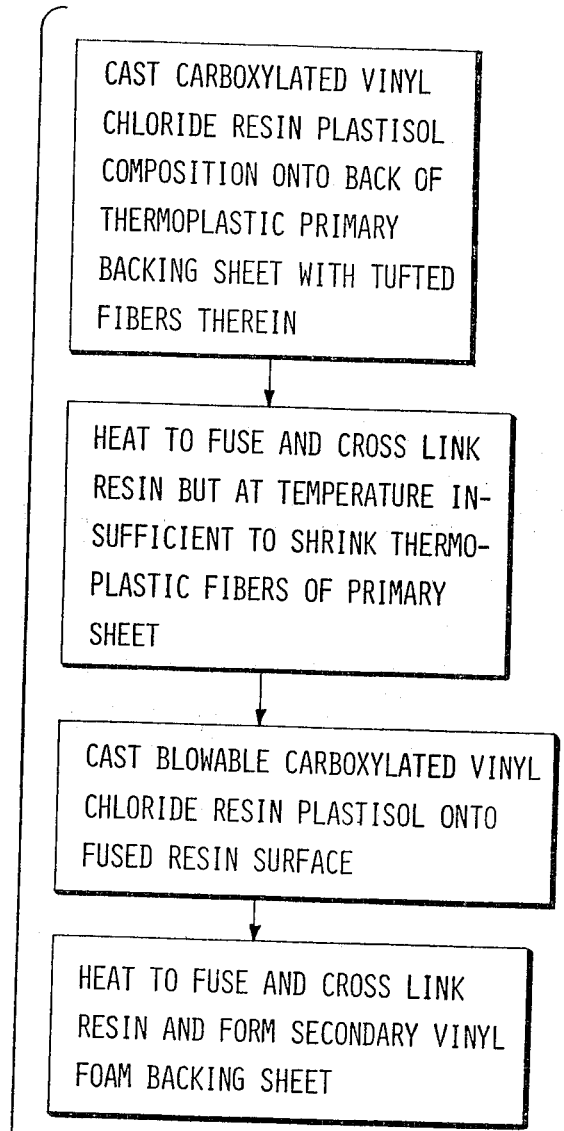
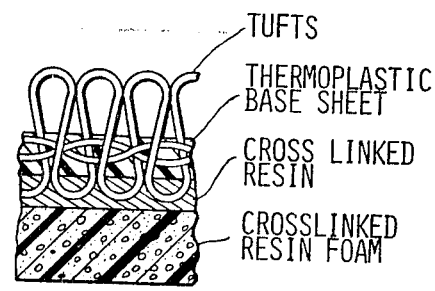
FIG. 4
INVENTOR
DAVID K. SLOSBERG
BY Crowley & Stevens
ATTORNEY

FLAME-RETARDANT VINYL FOAM CARPET AND METHOD

BACKGROUND OF THE INVENTION

Carpets; e.g., tufted, woven, knitted, etc., having a solid or foam thermoplastic backing; e.g., vinyl backing, laminated or otherwise secured thereto, have been widely adopted for both commercial and residential purposes. Tufted carpets generally comprise a pile face of fibers secured by a needle-punching or other operation to a primary woven or nonwoven base sheet. Typically, a secondary backing sheet material, such as a solid or foam thermoplastic backing; e.g., vinyl resin backing, is laminated to the primary backing sheet to form an integral tufted carpet. Where all the components are of synthetic material, the carpet is suited particularly for outdoor use.

The pile face of the carpet may be composed of a variety of both natural and synthetic organic fibrous materials, alone or in blends with other fibers. Typical materials would comprise, but not be limited to: acrylics (a long-chain synthetic polymer composed of at least 85 percent by weight of acrylonitrile units); modacrylics (a modified fiber composed of less than 85 percent, but generally at least 35 percent by weight of acrylonitrile units); polyamides like nylon (having a long-chain synthetic polyamide having reoccuring amide groups as an integral part of the polymer chain); olefins (a long-chain synthetic polymer composed generally of at least 85 percent by weight of ethylene, propylene or other ethylene unsaturated olefinic units; e.g., polypropylene); polyesters; rayon; rayon acetate; wool and other fibers and blends thereof.

The fibers employed in preparing a tufted carpet typically vary considerably in flame resistance. In general, modacrylic-type fibers and blends thereof tend to have good flame resistance and to char heavily on exposure to open flame, and, therefore, often act to retard the spread of flame. However, most other synthetic fibers, such as, for example, nylon, polypropylene and the acrylic fibers and similar thermoplastic fibers, tend to melt under intense heat and will often, on exposure to ignition, continue to burn, unless the melted synthetic material can be prevented from flowing into the active flame area. Natural fibers, depending on their water content, such as wool, have somewhat better flame resistance, but in general, wool is not desirable for tufting because of esthetic, supply and cost reasons, while polyesters like other synthetics have not as yet been made wholly fire-resistant.

The tufted carpet is generally prepared by tufting to the desired pile, height and density the fibers onto a primary backing. Although jute backings have been employed in the past, integral indoor-outdoor tufted carpets now often employ a thermoplastic woven or nonwoven base sheet, such as one prepared from an olefinic resin like polypropylene. Such thermoplastic base sheets are often sensitive to heat and generally subject to shrinkage at temperatures above a certain limit, such as above 250° F.; e.g., above 300° F. for polypropylene. In some cases, such shrinkage has been employed to increase the pile density after the tufting operation. However, such primary backing sheets being thermoplastic in nature melt on exposure to intense heat and feed the active flame area.

Some tufted carpets have a secondary backing comprising a mechanically frothed high-density, natural or synthetic elastomeric foam backing; for example, of styrene-butadiene rubber. Such rubber backings are not thermoplastic and are prepared generally by frothing a high-density latex, placing the froth directly on the carpet backing, and gelling and curing the foam in place. Foam rubber latex usually exhibits poor mechanical strength, and while the addition of additives may enhance flame resistance, such additives also increase the cost of the latex foam, and sometimes further diminish the mechanical strength. Such foam rubber backing is typically open-cell in nature, and thus not acceptable in outdoor use. Closed-cell rubber foam is more expensive and tends to approach the cost for preparing the higher mechanical strength, more fire-resistant vinyl resin foam backings. Sponge rubber backings prepared by employing chamical blowing agents have been used, but such backings in general have a poor record of flame resistance.

Thermoplastic; e.g., vinyl resin, backings, both solid vinyl and vinyl foam, have been employed as secondary backings, and are particularly adapted for use in outdoor-indoor carpet; for example, in a carpet containing a synthetic fiber face, such as nylon, a thermoplastic base sheet, such as polypropylene, with a solid or foam vinyl backing. In particular, vinyl foam, such as a closed-cell vinyl foam, has been widely adopted as a secondary backing due to its high resiliancy and mechanical strength and greater fire resistance than the froth or sponge rubber foam. Mechanically foamed vinyl resins have been employed as secondary foam backings. Such vinyl chloride resin systems require the employment of a wetting agent to obtain low viscosity and generally high levels of plasticizer. The higher plasticizer level may create serious problems relating to thermoplasticity and flammability of the resulting foam vinyl resin.

Chemically expanded vinyl foam has been employed as a secondary backing for tufted carpets. Such tufted carpets may be prepared by casting a vinyl chloride resin plastisol containing a blowing agent onto the back of the carpet and heating to expand and fuse the plastisol. In another technique, a preblown or foamed vinyl resin sheet is laminated; e.g., by heat, to the primary backing. Secondary backings of solid vinyl material may be similarly prepared by casting or by lamination. Thus, present vinyl-backed integral tufted carpets containing a thermoplastic base sheet are desirable, but the nature of the tufted yarns, the thermoplastic base sheet and the vinyl backing presents flammability problems in hospitals, nursing homes, schools and other public areas.

A number of tests have been proposed, accepted and used to determine standards of flame resistance and burning rate characteristics of carpets. One test is the Pill Test ASTM-D-2859-70T. Another test is the Tunnel Test ASTM-E-84 "Surface Burning Characteristics of Building Materials," wherein the industry's standard permits a maximum in the flame-spread classification in the test of 75. Another test called the Chamber Test has been developed by the National Fire Protection Association NFPA No. 255. In this test, the carpet is employed on the floor, whereas in the Tunnel Test, the carpet is tested on a tunnel ceiling and the carpet must have adequate heat resistance to prevent the carpet from delaminating from itself; that is, from face to back from the ceiling of the tunnel.

Since the use of a carpet having a tufted fiber face, primary backing or thermoplastic sheet material, a solid vinyl or vinyl foam secondary backing offers many functional and cost advantages, there is a need for developing a flame-resistant surface covering; e.g., tufted carpet which has or will exceed the standards of flame resistance and burning characteristics now required for the acceptance of such carpet in public areas.

SUMMARY OF THE INVENTION

My invention concerns flame-resistant surface coverings, such as carpets, having a thermoplastic backing and a method of preparing such flame-resistant products. In particular, my invention relates to a tufted carpet having a thermoplastic synthetic fiber face, such as of nylon, with a primary backing of a nonwoven thermoplastic heat-shrinkable sheet, such as polypropylene, and a secondary backing of a vinyl foam laminated thereto and the methods of preparing such carpets. More particularly, my discovery is directed to a flame-resistant carpet and method of producing said carpet which will have a flame-spread characteristic of less than 75 when tested in accordance with the Tunnel Test, and in addition, fall under the standard of class 1 or class 2 of the Chamber Test.

I have found that a flame-resistant vinyl-backed covering; e.g., a tufted carpet of low burning-rate characteristics, can be prepared by applying; that is, by coating or saturating or other means, a cross-linkable vinyl chloride resin to the thermoplastic base sheet; e.g., a sheet into which the pile face yarns are tufted, and, thereafter, cross-linking the resin so applied. The cross-linked resin enhances the tuft lock of the yarns of the base fabric sheet; for example, to 15 or more pounds in the tuft lock pull test. In addition, the cross-linked vinyl chloride resin prevents the delamination of the face fibers and thermoplastic base sheet and backing when the tufted carpet is exposed to intense heat or open flame.

In particular, I have discovered that a vinyl foam-backed tufted carpet having a thermoplastic heat-shrinkable base sheet, which carpet will pass both the Tunnel and Chamber Tests, may be prepared by applying a cross-linkable carboxylated vinyl chloride resin plastisol composition containing a compound; e.g., an amide, reactive with the carboxylated groups onto the back of the carpet, heating the plastisol composition to a temperature sufficient to cross-link the resin, but insufficient to substantially shrink the thermoplastic base sheet and, thereafter, laminating a vinyl foam to the cross-linked plastisol composition, or casting a blowable vinyl chloride resin composition onto the cross-linked vinyl and subsequently foaming the vinyl foam in place. In one embodiment, the plastisol composition may be fused and cross-linked prior to the lamination of the preformed vinyl foam sheet or prior to the casting of the blowable vinyl chloride plastisol composition onto the surface, or if desired, the cross-linkable vinyl chloride resin may be merely gelled and the subsequent lamination and casting take place followed by the heating so that the cross-linking and lamination and/or fusing and blowing occur during a single heating step.

I have also found that a flame-resistant, low-burning characteristic, vinyl-backed tufted carpet can be prepared by employing a solid vinyl or vinyl foam secondary backing, which secondary backing contains a cross-linkable or cross-linked vinyl chloride resin so as to render the vinyl backing sheet more thermosetting. The combination of a cross-linked coating on the primary backing in combination with a cross-linked vinyl secondary backing provides an exceptional flame-resistant tufted carpet. Consequently, I have found that the employment of a cross-linkable carboxylated vinyl chloride resin plastisol onto the back surface of the thermoplastic base fabric on fusion and cross-linking enhances the tuft lock, and further, such cross-linked coating keeps the face pile of the fabric securely bonded to the primary backing, and inhibits the shrinkage and cracking between the face and the primary backing under conditions of intense heat or open flame. Furthermore, the employment of a cross-linked vinyl secondary backing in combination with the first cross-linked coating inhibits the delamination of the secondary backing from the primary backing and, further, reduces the liquefaction of the vinyl backing and prevents it flowing into the open-flame area on ignition, thereby providing an integral tufted carpet of excellent flame resistance and low burning rate.

For example, I have discovered that in a carpet composed of a tufted nylon fiber face, a primary backing of a nonwoven, heat-shrinkage polypropylene resin and a thermoplastic plasticized vinyl foam backing laminated to the primary backing, that when a sample of such a carpet is ignited with a Bunsen burner flame for short periods of time; for example, less than 10 seconds, that the flame will go out when the source of ignition is removed. However, I have also found that if the flame is severe or extended; for example, a Bunsen burner flame for 20 to 30 seconds or more, sufficient synthetic polymers, such as nylon and polypropylene, will melt and ignite to keep and maintain the flame even after the flame source of Bunsen burner is removed.

I have noticed that this continuation of the flame is due to a loss of bond between the vinyl backing and the face which results in a separation, together with a shrinkage and cracking of the carpet face, allowing the primary backing of polypropylene and the face of nylon to separate and to burn readily. The expedient of making the vinyl foam backing or the polypropylene backing more flame-resistant through the use of bromine and phosphorus-containing additives or other flame-proofing additives is not wholly satisfactory, although such additives and techniques may be employed in my method. Such additives do not prevent the delamination and shrinkage of the carpet. The problem of delamination and shrinkage is particularly a problem where a thermoplastic primary backing like polypropylene is employed which is sensitive to and/or changes its dimensions; e.g., shrinks, in the presence of heat; e.g., 300° F. In the Tunnel Test, where a primary backing shrinks in the presence of heat, often the weight of the carpet face enhances the delamination at an early stage and promotes poor flame resistance and further liquefaction and feeding of the open-flame source.

My invention will be described for the purposes of illustration in connection with a tufted carpet containing a synthetic polymeric fiber as a face fiber, a thermoplastic primary backing and a vinyl foam secondary backing. My method may also be employed to prepare a wide variety of surface wall or floor coverings to include knitted and woven carpets and similar materials. However, where desired, a solid vinyl chloride resin or other thermoplastic secondary backing may also be employed, such as a solid sheet of an olefinic resin like polypropylene or a plasticized vinyl chloride resin, such as polyvinyl chloride or a vinyl chloride-vinyl acetate resin or another flammable woven or nonwoven sheet material. My invention comprises a flame-resistant vinyl foam-backed carpet comprising a synthetic polymeric face fiber secured to a thermoplastic heat-shrinkable primary backing sheet and a vinyl resin secondary backing secured to the primary backing sheet through the use of a cross-linked carboxylated vinyl chloride resin, which resin prevents the delamination of the vinyl secondary backing sheet from the thermoplastic primary backing sheet under intense heat; e.g., open-flame ignition conditions. Where the primary and/or secondary thermoplastic backing sheet contains a cross-linking compound and is not fully cross-linked during processing, additional cross-linking may occur on exposure to ignition which provides a charring rather than melting, thereby inhibiting flame spread.

My improved flame-resistant tufted carpet is prepared by providing a cross-linkable vinyl resin plastisol (or organosol) composition; coating (to include impregnating or saturating) a thermoplastic base sheet with the plastisol composition, contacting the plastisol thermoplastic backing with a secondary backing, such as a vinyl chloride resin backing such as a prefoamed foam or gas-expandable resin layer, and thereafter, heating the cross-linkable plastisol composition when in contact with the vinyl resin backing to a temperature sufficient to induce cross-linking of the plastisol layer, thereby securely bonding the vinyl resin secondary backing to the primary backing.

If desired, the thermoplastic resin backing may be preformed in solid or foam form and placed into contact with the liquid or partially fused or gelled cross-linkable vinyl resin plastisol through the use of pressure rollers, and heated to complete the fusion and cross-linking to bond the secondary backing sheet. The secondary backing may be cast in a liquid plastisol composition with or copolymers a blowing agent and with or without a cross-linkable vinyl chloride resin onto the pregelled but cross-linkable or curable chloride resin plastisol layer, and then heated to induce fusing and expansion of the secondary backing together with fusing and cross-linking of the curable vinyl resin plastisol. In particular, the techniques of laminating a preformed vinyl resin foam layer to the back of a thermoplastic shrinkable primary backing, such as polypropylene, may be satisfactorily carried out by employing the process described in the copending U.S. Pat. application Ser. No. 687,608, filed Dec. 4, 1967 and now U.S. Pat. No. 3,560,284, hereby incorporated by reference.

The cross-linkable or curable vinyl resins which may be employed in connection with my invention comprise those vinyl resins containing pendant carboxyl or hydroxyl groups which can be cross-linked with various types of modifiers, such as resins, to enhance the thermosetting qualities of the resin, increase hardness, tensile strength and solubility. Typical resins include vinyl halide resins including the homo and such as vinyl chloride, copolymers with short-chain unsaturated fatty acids like vinyl acetate as well as polyvinyl chloride, which h resins have been interpolymerized with or in the presence of or blended with an unsaturated acid. For example, a short-chain unsaturated carboxylic acid, such as an alpha beta $C_2$–$C_6$, unsaturated aliphatic carboxylic acids like acrylic acid, methacrylic acid, itaconic acid, fumaric acid and maleic acid. An interpolymerized carboxylated vinyl chloride resin containing from about 0.25 to 25 parts per hundred parts of the resins of the unsaturated carboxylated acid is the preferred carboxylated vinyl chloride resin for use in my invention; e.g., 1 to 4 parts.

In particular, high molecular weight carboxylated vinyl chloride dispersion-type resins are most preferred with a molecular weight sufficiently high to permit dispersion of the resin particles in a plasticizer or a combination of primary and secondary plasticizers to form a plastisol, or with the addition of small amounts of an organic solvent or diluent to form an organosol. The high molecular weight dispersion-type vinyl chloride resins are preferred to permit the resin particles to have a limited solubility in the plasticizer so as to form high solid-type plastisols containing, for example, 25–60 percent resin particles. Although other lower molecular weight vinyl chloride carboxylated resins may be employed in part, the lower molecular weight resins; e.g., used in solvent coatings, are not preferred, since they may tend, when used alone, to solubilize in the plasticizers employed in the plastisols and be too viscous, thereby preventing the preparation of high solid content plastisols or organosols.

The cross-linkable or curable vinyl resins employed in the plastisol composition should be subject to cure at a temperature in excess of the partial fusing or gellation temperature of the plastisol; e.g., 300°–450° F.; otherwise, the plastisol will cross-link at the lower temperature and fail to provide the proper adhesive or tacky surface to the vinyl solid or foam resin secondary backing. Typically, my carboxylated resins contain a small; that is, a minor amount of a cross-linking or curing agent. Typical cross-linking agents which may be employed in connection with unsaturated carboxylated vinyl chloride resins would include, but not be limited to, those compounds reactive with the pendant carboxylic acid or hydroxyl groups, such as amido resins, such as melamine and urea resins, phenol-formaldehyde resins as well as epoxy compounds and polyisocyanates, such as diisocyanate and isocyanate amides. Carboxylated vinyl resins may be cross-linked with urea-formaldehyde esters, a diepoxide, trimethylol phenol, tris 1-2-methyl-azirdinyl-phosphazene oxide, etc., while hydroxylated vinyl resins may be cross-linked with urea-formaldehyde esters, a urethane like toluene diisocyanate, etc.. The amounts of such compounds depend upon the amount of pendant groups and the degree of cross-linking desired, but typically may range from 0.5 to 15 parts per hundred parts of resin; e.g., 1.0 to 6.0.

The degree of cross-linking in the plastisol compositions employed should typically be balanced between the desired melt resistance and the thermoplasticity required for any bonding or lamination. All of the cross-linking need not occur in the lamination process, since residual cross-linking effects will be beneficial on exposure to ignition. A cross-linkable controlled melt thermoplastic vinyl chloride resin composition would typically comprise a homo or copolymer of vinyl chloride, a primary and secondary plasticizer, blowing agents where applicable, pigments, fillers, stabilizers and a carboxylated vinyl chloride resin together with a reactive compound. Where a carboxylated vinyl chloride resin is employed, typically amounts where the carboxylated resin contains from 1 to 5 percent of carboxylated groups, amounts of from up to about 50 percent by weight of the resin of the plastisol composition often can be employed without unduly affecting the thermoplasticity of the composition.

If desired, the cross-linkable vinyl resin plastisol composition, rather than being applied as a coating to the back surface of the tufted yarns on the thermoplastic base sheet, the coating may be used as a saturant for woven thermoplastic base sheets prior to or after the tufting operation. In such an operation, the saturant may be applied before the material is used for tufting, and the system may be catalyzed for rapid cross-linking; for example, with a melamine resin after tufting. The cross-linked vinyl chloride resin, for example, would reinforce a polypropylene woven or nonwoven base sheet at elevated temperatures to prevent shrinkage and impart a high degree of dimensional stability.

I have found that a chemically expanded vinyl foam secondary backing for lamination which has been made less thermoplastic by the inclusion of reactive materials may be prepared and laminated to the cross-linked or cross-linkable vinyl resin plastisol composition. In the preparation of such cross-linked vinyl foam systems, sufficient thermoplasticity should be retained in the vinyl foam to permit bonding and lamination by heating and melting the foam surface to the primary backing. In the formulation of such blowable vinyl chloride resin compositions, the cross-linking agents selected must have a high enough activation temperature to permit the flowing agent to decompose before substantial cross-linking takes place in order to provide a usable foam. In addition, where a carboxylated vinyl chloride resin is employed, often conventional blowing agents, such as azodicarbonamide, oxybissulfonyl hydroxide and others, are not entirely satisfactory in the presence of such acidic groups. Accordingly, it is preferred to employ a blowing agent which is not subject to activation, deactivation or alteration in the presence of such groups, such as, for example, a substituted thiatriazole; that is, blowing agents having a decomposition point of about 240° F. or above. For example, with the employment of such thiatriazole blowing agents, an amide cross-linking agent employed with a maleic acid carboxylated vinyl chloride resin which permits the blowing agent to decompose before cross-linking takes place would comprise, for example, a dicyandiamide.

I have also found that cross-linked vinyl foams may be prepared employing the use of a liquid nitrile or other natural or synthetic elastomers or rubber compatible with the vinyl resin, which rubber or synthetic elastomer may be cured employing various curing agents such as radiation or peroxides, thereby on curing, providing a more thermoset vinyl chloride foam. Typical elastomeric polymers which may be employed would include the curable liquid acrylonitrile-type rubbers, such as acrylonitrile-butadiene and acrylonitrile-diene rubbers and carboxylated nitrile rubbers. Such elastomers should be compatible with the vinyl chloride resin of carboxylated vinyl chloride resins employed in the plastisol or blowable composition. Such rubbers may be cured by the employment of curing agents, such as organic peroxides such as dicumyl peroxide, 2,5 dimethyl 2,5 ditertiary butyl peroxy hexane, alpha, alpha ditertiary butyl peroxy diisopropyl benzene and similar materials typically having a decomposition temperature of greater than 100° C., such as greater than 120° C. The amount of the elastomer to employ in the vinyl chloride resin may vary, depending on the degree of cross-linking desired, such as amounts up to 60 percent of the vinyl chloride resin present; e.g., 10 to 40 percent. Besides peroxides, other curing agents can be employed for such nitrile rubbers including sulphur, sulphur-containing organic materials and oxides such as magnesium oxide.

Where desired, a blowable or nonblowable cross-linkable vinyl chloride resin plastisol composition containing a carboxylated resin and a reactant material or a liquid nitrile rubber or a combination thereof may be cast directly onto the back of a primary backing and thereafter, be heated to be cured in place so that the solid vinyl or vinyl foam so formed by being cross-linked imparts dimensional stability to the thermoplastic base sheet. Alternatively, the plastisol may be cast on a carrier sheet, such as a Teflon-covered belt or release casting paper, etc., and the back of the carpet may then be laid directly on the liquid or gelled plastisol composition with the cure and subsequent expansion, if any, taking place. Where such a technique is employed, a much higher degree of cross-linking can be employed in the plastisol composition, since the subsequent lamination step has been eliminated and dimensional stability, tuft lock and a secondary backing is accomplished in one operation.

BRIEF DESCRIPTION OF THE DRAWINGS

FIG. 1 is a schematic illustration of one embodiment in my invention employing a cross-linkable vinyl resin as a precoat in preparing a vinyl foam-coated tufted carpet.

FIG. 2(a–d) illustrates a fragmented representative cross-sectional view of various steps in the production of the tufted carpet of the method shown in FIG. 1.

FIGS. 3–5 are representative block flow diagrams together with illustrated fragmentary representative cross-sectional view of tufted carpets produced by the illustrated process.

DESCRIPTION OF THE EMBODIMENTS

FIGS. 1 and 2 illustrate the preparation of a vinyl foam-backed tufted carpet wherein tufted material 10 composed of a plurality of loops 25 secured to a thermoplastic base fabric, such as a polypropylene fibrous base sheet 26, is coated with a heat-sensitive curable or cross-linkable plastisol composition 12 from a reservoir 11. The coated product is then heated in an oven 15 to fuse and cross-link the plastisol composition, thereby securing the tufted loops 25 to the base fabric 26. Typically, the temperature and time of fusing is insufficient to shrink substantially the base fabric; for example, less than 300° F. The coated material then passes under a high-intensity heat source 16, such as infrared or radiant gas burners, wherein the heat is directed to the fused cross-linked surface to impart sufficient sensible heat to the coating. A relatively cool closed-cell vinyl chloride resin foam layer 17 is then placed in contact with the heated surface, the heated surface having enough sensible heat to melt a portion of the foam, thereby adhering the foam to the fused cross-linked plastisol layer 12 as the foam and coated material pass through the pair of pressure rolls 18. Optionally, embossing roll 19 is employed with a pressure roll 20 to densify the outer surface 29 of the foam to emboss a pattern similar to 31, such as a waffle-like pattern on the outer surface of the foam. Cooling rolls 21 are also optionally employed before the finished carpet is rolled. A typical vinyl resin plastisol precoat formulation employed in this process is shown in Table I.

TABLE I

Vinyl Plastisol Precoat Formulation

| Ingredients | Parts by Weight |
|---|---|
| 1. Vinyl chloride-vinyl acetate (9–10%) copolymer dispersion low fusion resin | 100 |
| *2. Dispersion grade carboxyl modified dispersion resin; e.g., vinyl chloride-vinyl acetate copolymer resin containing reactive unsaturated carboxylic acid groups (e.g., 103%) (GEON 130 × 17) | 100 |
| 3. Plasticizer primary—cresyldiphenyl phosphate | 200 |
| 4. Plasticizer secondary—epoxidized soybean oil | 10 |
| 5. Pigment—Antimony Trioxide (71.4% in dioctyl phthalate | 6 |
| 6. Stabilizer—Barium-cadmium fatty acid soap | 6 |
| 7. Cross-linking carboxylic reactive compound—Dicyandiamide (67.5% pulverized grade dispersion in dioctyl phthalate) | 10 |
| 8. Pigment and filler as required | |
| Total | 432 |

*Average carboxyl content 1.67 grams per 100 grams of resin

The viscosity of the plastisol composition is such that it will flow sufficiently to fill in the interstices between the tufted yarns and the fibers of the base fabric so as to lock the tufted yarns to the base fabric. The plastisol also covers the outer fibers of the base fabric sufficiently to prevent excessive melting or shrinkage of the base fabric. If desired, the plastisol may be applied in two or more coating applications wherein the first application is employed to lock the tufted yarns to the base fabric and to fill the interstices, and the second plastisol usually of considerably higher viscosity is employed to be held on to the outer surface of the base fabric to provide the bonding of the base fabric to the thermoplastic sheet.

The illustrated formulation contains a combination of conventional copolymer vinyl chloride-vinyl acetate resin which permits lamination by heat activation through heating of the fused surface, while containing sufficient amide and carboxylated vinyl chloride resin to impart the desirable thermoset characteristics to prevent the shrinkage and delamination of the base fabric upon subjecting to intense heat or open flame. Where a vinyl foam backing is not required in preparing the carpet, the formulation may contain a higher degree of cross-linking; that is, a greater percentage of the carboxylated vinyl chloride resin and amide, for example, up to 100 percent of the carboxylated vinyl resin.

The preformed vinyl chloride resin backing sheet employed may be any thermoplastic foam sheet subject to lamination as illustrated, and may, for example, comprise those partially cured or cross-linked carboxylated vinyl chloride resins or vinyl chloride-nitrile rubber compositions which in combination with the cross-linked precoat provide even greater and enhanced flame resistance to the tufted carpet so prepared.

In the process described, it is not necessary to heat the entire carpet; in fact, it is preferable that the heat be applied only to the precoated plastisol coating. The temperature of the plastisol coating is preferably at the time of lamination in excess of 300° F., more preferably 330° F. or more. The temperature of the materials other than the surface of the plastisol is preferably maintained as cool as possible, for example, below 290° F. Densification and embossing of the thermoplastic foam layer are typically achieved by reheating back with radiant heat source contacting the layer with a cooled roll (70°–200° F.), which method partially melts the outer foam surface to provide a reduction; e.g., 3–10 percent, in thickness in the formation of a thick skin thereon.

A carpet produced by the method described with a nylon, acrylic modacrylic, nylon-acrylic blend or polypropylene face, a polypropylene base fabric, and a vinyl foam secondary backing laminated to the cross-linked vinyl chloride resin composition when tested in accordance with the Tunnel Test will have a flame-spread classification of less than 75, and when tested in accordance with the Chamber Test, will fall under the standard of class 1 or class 2 of said test.

FIG. 3 illustrates another method in a block flow diagram, wherein a flame-retardant tufted carpet is prepared having a heat-shrinkable thermoplastic base sheet, such as a fibrous polypropylene fabric. The base is saturated with a carboxylated modified vinyl chloride dispersion-grade resin. A typical high viscosity thixotropic saturant-type formulation is shown in Table II, which formulation may be used as a saturant or coating prior to the tufting of a fiber through the base sheet.

TABLE II

Vinyl Plastisol Saturant Formulation
(a high viscosity thixotropic system)

| Ingredients | Parts by Weight |
|---|---|
| 1. Vinyl chloride-vinyl acetate (9–10%) copolymer dispersion low fusion resin | 50.0 |
| 2. Vinyl chloride maleic ester copolymer resin (PLIOVIC MC-85) | 50.0 |
| 3. Plasticizer—cresyldiphenyl phosphate | 25.0 |
| 4. Plasticizer—chlorinated parafin (43–45% chlorine) | 15.0 |

| | |
|---|---|
| 5. Plasticizer—Dioctyl phthalate | 26.7 |
| 6. Stabilizer—Barium-cadmium organic acid salt | 1.67 |
| 7. Pigment—Antimony trioxide | 3.00 |
| 8. Cross-linking heat-activated amide resin hexamethoxymethyl melamine | 3.00 |
| 9. Thickener—finely divided silica oxide (10.9% in dioctyl phthalate) | 15.00 |
| Total | 189.4 |

The formulation is catalyzed for rapid cross-linking through the use of a reactive amide compound, such as a hexamethoxy-methyl melamine, with the carboxyl groups of the vinyl chloride resin. The saturated primary backing is gelled or fused before tufting. Fusion temperatures of 250° to 300°F. are employed; e.g., 275° F. After saturation, the saturated base may then be tufted; for example, by needle-punching fibers in and through the saturated base sheet, or if desired, the tufting operation can be conducted after the cross-linking of the saturant or coating. The tufted saturated base sheet is then heated to a temperature to cross-link the resin. The cross-linked saturated base fabric is then stabilized against further dimensional stability, yet retains sufficient thermoplasticity so that a vinyl resin foam sheet as a secondary backing may be laminated by heat to the back of the tufted saturated cross-linked base sheet, either by casting a blowable vinyl resin plastisol composition onto the back and heating, or by laminating a preformed vinyl foam by heating the surface of the base sheet or the foam sheet or both prior to contact. The base sheet may be saturated by coating or otherwise, such as bead coating, knife coating or the like, reverse roll coating or the like, employing coating weights of from about 1 to 16 ounces per square yard with 4 to 6 ounces per square yard typically desirable. The cross-linked vinyl chloride saturant coating reinforces the polypropylene base sheet at elevated temperatures, stabilizing the sheet, and thereby, preventing shrinkage when exposed to intense heat or open flame, and thereby, permitting the cross-linked saturant to act as a flame retardant.

FIG. 4 illustrates the preparation of a flame-retardant tufted carpet wherein rather than a preformed foam sheet, a carboxylated modified vinyl chloride dispersion resin plastisol composition is cast onto the back of a thermoplastic base sheet with tufted fibers therein, the thin cast coating sufficient to fill the interstices between the backs of the tufted yarns, the cast coating heated to fuse and to cross-link the resin at a temperature generally insufficient to shrink the thermoplastic tufted base. A vinyl chloride formulation such as shown in Table I may be employed for this purpose with temperatures of up to 300° F. generally employed. Thereafter, in a preferred embodiment, a carboxyl modified vinyl chloride dispersion grade resin plastisol composition is then cast in a thin coating onto the gelled or fused and cross-linked first coating, the second plastisol composition containing a chemical blowing agent sufficient to form a vinyl foam on heating. In this application, the coated tufted carpet is then heated sufficiently to decompose the blowing agent and to fuse and cross-link the resin, thereby providing a flame-retardant vinyl foam-backed cross-linked tufted carpet having a cross-linked first and second plastisol composition. The temperature of heating the second plastisol composition may range from about 250° to 400° F. Heat is applied primarily to the backing; e.g., by a radiant gas or infrared heater in an oven, to prevent heat damage to the face. Due to the previous application of the cross-linked resin onto the thermoplastic base sheet, the base sheet will be inhibited under heat shrinkage during the period required to cross-link and blow the expandable vinyl chloride resin formulation.

FIG. 5 illustrates the preparation of a flame-retardant tufted carpet wherein the heat-shrinkable thermoplastic base sheet is stabilized by directly casting a gas-expandable cross-linkable vinyl chloride resin plastisol composition onto the base surface of the tufted base sheet and, thereafter, heating the resin composition to a temperature sufficient to decompose the chemical blowing agent and to cure and fuse the resin composition. As illustrated, the cross-linked, controlled-melt, chemically expanded vinyl foam composition is cast on a carrier sheet, such as a Teflon-covered belt or release sheet, and the back surface of the carpet is then laid thereon with cure and expansion taking place with the carpet in place. Of course, if desired, the formulation may then be cast in a thin coating directly on the back of the carpet and cured in place. If a solid vinyl backing or a vinyl foam of higher density is desired, the amount of the blowing agent may be reduced or entirely eliminated. In this type of preparation of a flame-retardant carpet, a much higher degree of cross-linking can be employed in the formulation, since the subsequent lamination step of the secondary backing to a precoat has been eliminated. In this embodiment the cross-linked secondary solid vinyl or vinyl foam backing directly provides the dimensional stability to the heat-shrinkable thermoplastic base sheet.

In the foregoing example and in the preparation of preformed cross-linkable or cross-linked vinyl chloride resin foam sheets for use in my invention, a vinyl foam suitable for lamination with the desired characteristics; that is, a foam which has been reduced in thermoplasticity by the inclusion of cross-linking and reactant materials, may be prepared by employing a reactive dispersion grade carboxylic modified vinyl chloride resin, either alone or in combination with polyvinyl chloride and vinyl chloride-vinyl acetate or other vinyl halide resins. A typical formulation for employing a carboxylated vinyl chloride resin is found in Table III.

TABLE III

Vinyl Foam Formulation

| Ingredients | Parts by Weight |
|---|---|
| Low molecular weight polyvinyl chloride dispersion resin | 73.5 |
| Vinyl chloride-vinyl acetate copolymer resin containing reactive carboxylic acid groups (1–3%) | 21.5 |
| Dicyandiamide (67.5% pulverized grade dispersion in dioctyl phthalate) | 4.0 |
| Blowing agent—substituted thiatriazole (decomposition point about 240°F.) POROFOR TR trademark of Naftone, Inc. (45% in dioctyl phthalate) | 3.0 |
| Stabilizer—lead phthalate | |
| Pigment—Antimony trioxide (70% in dioctyl phthalate) | 2.0 |
| Pigment—Aluminum trihydrate (70% in dioctyl phthalate) | 1.5 |
| Plasticizer—Epoxidized tall oil | 10.5 |
| chlorinated parafin | 12.0 |
| cresyldiphenyl phosphate | 37.0 |
| Medium-high molecular weight peroxide curable liquid acrylonitrile elastomeric butadiene copolymer | 5.0 |
| Pigment and filler as required | |
| Total | 170.0 |

Such a formulation permits the chemical blowing agent to decompose at or before substantial cross-linking of the vinyl chloride resin takes place in order to provide a usable foam. The formulation includes the use of a thiatriazole blowing agent and a dicyandiamide curing agent.

An alternate formulation is shown in Table IV wherein a vinyl chloride plastisol composition is prepared which includes a liquid peroxide-curable nitrile rubber.

TABLE IV

Vinyl Foam with Cross-Linked Liquid Rubber

| Ingredients | Parts by Weight |
|---|---|
| Preblend | |

| | |
|---|---|
| Medium-high molecular weight peroxide curable liquid acrylonitrile-butadiene elastomeric copolymer | 28.85 |
| Plasticizer—epoxidized tall oil | 3.85 |
| Plasticizer—diisodecyl phthalate | 2.89 |
| Plasticizer—cresyldiphenyl phosphate | 19.23 |
| Chlorinated parafin—(low viscosity 1.5-2.5 poises 43-45% chlorine) | 19.23 |
| Polymeric chlorinated ethyl phosphate (27% chlorine and 15% phosphorus) PHOSGUARD C22R Monsanto Company | 3.85 |
| Peroxide cross-linking agent-2,5 bis(tert butyl peroxy)-2,5 dimethyl hexane | 1.92 |
| Preblend | 79.82 |
| Blowing agent - azodicarbonamide (50% in dioctyl phthalate) | 5.77 |
| Pigment—zinc oxide (70% in dioctyl phthalate) | 4.04 |
| Antioxidant | 0.32 |
| Stabilizer—dibasic lead phthalate (70% in dioctyl phthalate) | 2.89 |
| Antimony trioxide (60% in dioctyl phthalate) Pigment as required | |
| Polyvinyl chloride resin | 51.92 |
| Vinyl chloride-vinyl acetate resin | 48.08 |
| Total | 197.33 |

My invention has been described in particular and illustrated applying a solid or foam vinyl backing; however, it is recognized that other thermoplastic secondary backing solid and foam materials may be used, which materials if not prepared as set forth in my invention would constitute a flammable hazardous tufted carpet, such as, for example, thermoplastic polymers like olefins, for example, $C_2$-$C_4$ olefins such as polyethylene, polypropylene, ethylene propylene, ethylene butene, ethylene propylene terpolymers and the like as well as thermoplastic urethane resin foam secondary backings.

The vinyl chloride resin plastisol composition in my invention may be prepared employing conventional plasticized stabilizers, pigments, dyes, blowing agents, flame-retardant additives, and the like. However, it is often desirable to incorporate or to employ halide or phosphorus-containing liquid organic materials, such as brominated and chlorinated parafin, and other materials as well as organic liquid phosphates as primary or secondary plasticizers in order to enhance the flame resistance of the resulting formulations. In connection with my method and the curable and cross-linkable resins and materials used, it is recognized that such curing and cross-linking may also be affected alone or in combination with various modifiers and monomers by the employment of radiation. Electron beams or isotope radiation processes may be employed; e.g., Cobalt 60 or cesium 137 source or accelerators to produce a high-energy electron beam; e.g., at dosage rates of 1-25 megarads.

My invention imparts enhanced dimensional stability and flame retardants to a tufted carpet wherein the tufts are secured to a thermoplastic heat-shrinkable nonwoven or woven base sheet such as one prepared of woven thermoplastic fibers such as olefinic fibers like polypropylene and particularly those secondary backings which are heat-shrinkable at temperatures in excess of, say 300° F., and more particularly, 250° F.

What I claim is:

1. A method of preparing a flame-resistant integral surface covering such as a carpet, which covering comprises a face surface of fibers, a primary backing sheet, the sheet composed of heat-shrinkable thermoplastic fibers, the face surface of the fibers secured to the surface of the primary sheet, and a secondary backing sheet, the sheet composed of a thermoplastic resin, the secondary sheet secured to the opposite surface of the primary sheet, which method comprises:
    a. providing a cross-linkable or curable vinyl chloride resin plastisol composition;
    b. applying the resin composition onto at least one surface of the primary backing sheet;
    c. heating the applied resin composition to a temperature to solidify the resin composition and to at least partially cross-link or cure the resin composition while maintaining the temperature of the primary sheet below the heat-shrinkable temperature thereof; and
    d. bonding the opposing surfaces of the primary and secondary backing sheets together, employing the thermoplastic properties of the solidified partially cross-linked or cured resin composition, thereby providing an integral flame-resistant covering wherein the primary and secondary backing sheets are prevented from shrinking and separating when exposed to open-flame conditions.

2. The method of claim 1 wherein the thermoplastic backing sheet comprises a nonwoven base sheet composed of polypropylene fibers, and which sheet is characterized by a pile face surface of tufted yarns secured to the backing sheet.

3. The method of claim 1 which includes heating the vinyl resin plastisol composition while maintaining the temperature of the thermoplastic base sheet below about 300°F.

4. The method of claim 1 which includes:
    a. bonding the primary and secondary backing sheets by heating the surface of the solidified vinyl resin plastisol composition by directing radiant heat onto the surface thereof; and, thereafter
    b. contacting the heated surface with a thermoplastic resin foam secondary backing sheet, and bonding the foam backing sheet to the fused surface through the residual heat retained in the heated surface of the resin.

5. The method of claim 1 which includes:
    a. saturating the fibers of the primary backing sheet with the vinyl chloride plastisol composition;
    b. heating the saturated backing sheet to a temperature sufficient to gell or fuse the vinyl resin plastisol saturant therein; and
    c. tufting fibers through the solid saturated thermoplastic backing sheet to provide a backing sheet which is characterized by a pile face surface of tufted yarns in the saturated thermoplastic base sheet.

6. The method of claim 1 which includes:
    a. casting a vinyl chloride resin plastisol composition containing a blowing amount of a blowing agent onto the cross-linked and fused vinyl chloride resin composition; and, thereafter
    b. heating the cast plastisol layer to a temperature sufficient to fuse and expand the layer, thereby forming a vinyl foam secondary backing sheet bonded to the cross-linked and fused vinyl chloride resin composition.

7. The method of claim 1 which includes:
    a. saturating the thermoplastic fibrous primary backing sheet with the vinyl chloride resin;
    b. gelling or fusing the saturated sheet at a temperature below about 300° F.;
    c. tufting fibers onto and through the saturated thermoplastic base sheet to provide a face surface of tufted yarns;
    d. heating the tufted saturated primary sheet to cross-link the vinyl chloride resin at a temperature below the shrinking temperature of the sheet; and, thereafter
    e. laminating a vinyl resin foam secondary backing sheet to the surface of the cross-linked fused vinyl chloride resin composition by heating one or both surfaces.

8. The method of claim 1 which includes;
    a. casting the vinyl chloride resin plastisol which contains a blowing agent onto the back of the primary backing sheet having a tufted pile face;
    b. heating to fuse and cross-link the vinyl chloride resin plastisol at a temperature insufficient to shrink the thermoplastic tufted base;
    c. casting a blowable cross-linkable or curable vinyl chloride resin plastisol onto the fused resin surface; and, thereafter,
    d. heating to fuse, to expand and to cross-link or cure the resin, thereby bonding the foam layer to the first layer.

9. The method of claim 1 wherein the cross-linkable vinyl chloride resin comprises a vinyl chloride resin plastisol composition which contains a vinyl chloride resin having pendant hydroxyl or carboxylic groups and a compound reactive with said groups to cross-link the resin, the cross-linkable vinyl chloride resin present in an amount ranging from about 0.5 to 25 parts of the resin per hundred parts of the vinyl chloride resin.

10. The method of claim 1 wherein the curable vinyl chloride resin comprises from about 10 to 60 percent by weight of a synthetic elastomeric nitrile rubber compatible with the vinyl chloride resin and a curing compound adapted to cure the nitrile rubber.

11. The method of claim 1 which includes:
   a. providing a vinyl resin composition comprising from about 10 to 40 percent by weight of a curable nitrile rubber and a small amount of a peroxide curing agent and a blowing amount of a blowing agent;
   b. casting the blowable curable nitrile rubber vinyl chloride resin plastisol composition onto the back surface of the primary backing sheet;
   c. contacting the surface of the nitrile vinyl chloride resin composition with the back surface of a primary backing sheet containing a plurality of tufted yarns therein; and
   d. heating the nitrile vinyl chloride resin composition to a temperature sufficient to form a cellular-cured nitrile resin secondary backing sheet thereon.

12. The method of claim 1 which includes:
   a. casting a thin layer of a vinyl chloride resin composition containing a carboxylated vinyl chloride resin and a small amount of an amino-aldehyde resin adapted to cross-link with the carboxylated vinyl chloride resin onto the back surface of a primary backing sheet containing a tufted face surface and back stitches on the back surface thereof;
   b. heating said vinyl chloride resin composition to a temperature sufficient to gell or fuse the vinyl chloride, while maintaining a temperature below the heat-shrinking temperature of the primary backing sheet, directing radiant heat onto the back surface of the gelled or fused vinyl chloride resin composition;
   c. contacting the heated gelled or fused surface of the resin composition with a vinyl chloride closed-cell prefoamed vinyl foam layer, the temperature of the surface sufficient to melt a small portion of the vinyl chloride foam layer and to bond it to the resin surface, thereby providing an integral tufted carpet.

13. An integral flame-retardant surface covering, such as a carpet, which comprises in combination:
   a. a primary backing sheet comprising thermoplastic fibers, which fibers are subject to shrinkage at a temperature in excess of about 300° F;
   b. a face of carpet yarn secured to one surface of said primary sheet to provide a face surface thereon; and
   c. a layer of a fused cross-linked or cured vinyl chloride resin plastisol composition, as a secondary backing sheet, bonded and secured to the back surface of the primary backing sheet, the thermoplastic fibers of the base sheet maintained in a substantially nonheat-shrinkable form and inhibited from shrinkage on exposure to open flames by the fused cross-linked vinyl chloride resin.

14. The carpet of claim 13 wherein the backing sheet of thermoplastic fibers is composed of polypropylene fibers subject to heat shrinkage and the fused cross-linked vinyl chloride plastisol composition comprises a vinyl chloride resin foam layer.

15. The carpet of claim 13 wherein the fused cross-linked vinyl chloride plastisol composition comprises a cross-linked and cured vinyl chloride-nitrile rubber foam layer.

16. The carpet of claim 13 which includes a layer of thermoplastic foam, one surface of the foam sheet bonded to the surface of the fused cross-linked resin plastisol composition, the thermoplastic foam comprising a vinyl chloride cross-linked resin.

17. The carpet of claim 13 which includes the primary backing sheet saturated with a fused cross-linked vinyl chloride resin plastisol composition.

18. The carpet of claim 13 wherein the primary backing sheet comprises a nonwoven fabric having a face of tufted yarns and the fused cross-linked vinyl chloride resin plastisol composition is bonded to the back surface thereof, the fused layer filling in the interstices between the tufted yarn loops on the back of the primary sheet.

19. An integral flame-retardant vinyl foam-backed tufted carpet, which carpet comprises in combination:
   a. a base fabric sheet comprising thermoplastic fibers, which fibers are subject to shrinkage at temperatures in excess of about 250° F;
   b. tufted yarns secured through and to said base fabric sheet to provide a tufted pile face surface and the yarn loops on the back surface; and
   c. a layer of a fused cross-linked carboxylated vinyl chloride plastisol composition bonded to the back surface, the fused layer substantially filling in the interstices between the tufted yarn loops and the base fabric, the fused plastisol composition the sole adhesive employed to lock the tufted yarns to the base fabric, the thermoplastic fibers of the base fabric maintained in a substantially non-heat-shrinkable form and inhibited from shrinkage on exposure to open flames by the cross-linked vinyl chloride resin, a layer of thermoplastic resin as a secondary backing, one surface of the sheet bonded to the surface of the fused plastisol composition.

20. The carpet of claim 19 wherein the secondary backing is a vinyl chloride resin foam sheet.

21. The carpet of claim 19 wherein the secondary backing is a cross-linked fused vinyl chloride resin sheet.

22. The carpet of claim 19 wherein the secondary backing is a fused cross-linked vinyl chloride resin closed-cell foam layer bonded to the surface of the fused cross-linked resin solely by the melted surface of the foam layer.

* * * * *